United States Patent Office 2,893,892
Patented July 7, 1959

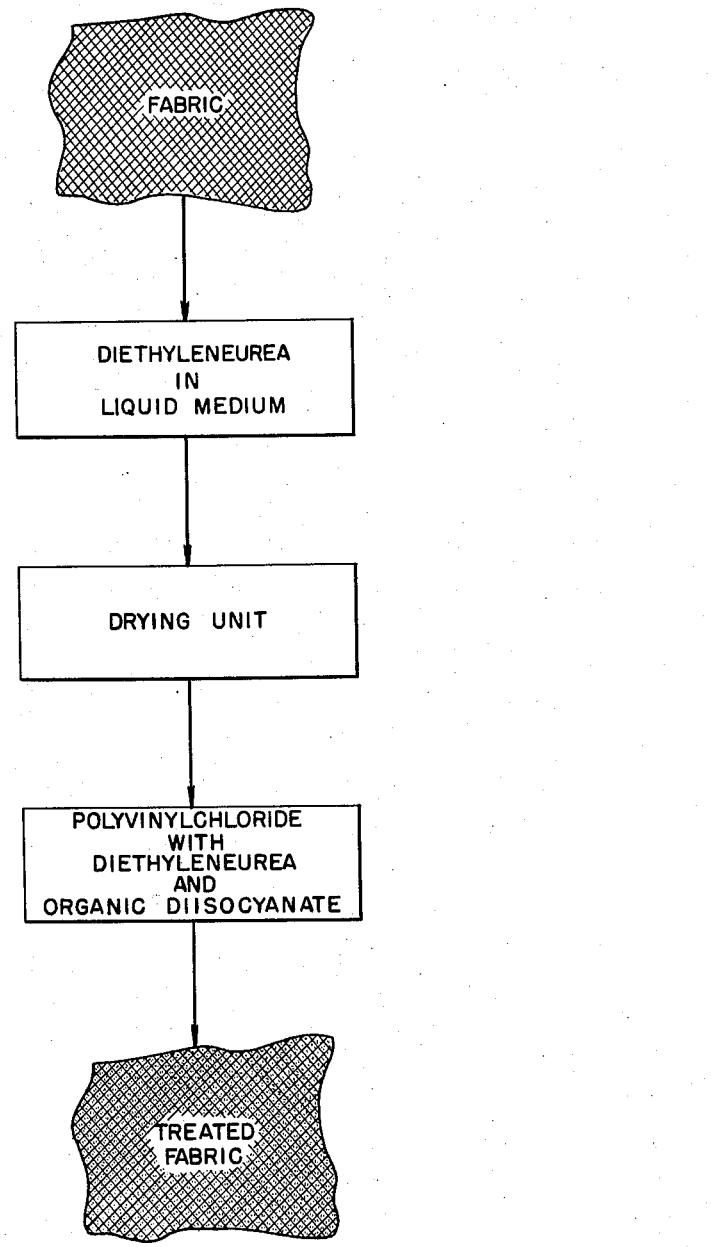

2,893,892

METHOD FOR THE COATING OF GLASS THREADS AND TISSUES WITH ARTIFICIAL RESIN

Jules Pinte, Maurice Coupez, and Paul Rochas, Lyon, France, assignors to Centre Technique Industriel dit: Institut Textile de France, Paris, France Application December 7, 1954, Serial No. 473,736

Claims priority, application France December 10, 1953

3 Claims. (Cl. 117—72)

The present invention relates to a method of coating fibrous products, such as threads and tissues, and more particularly threads and tissues of glass, with synthetic resins.

It is well known that a film of synthetic resin will not adhere effectively to glass threads or tissues. The adherence of the resin to the glass threads or tissues is not only not permanent but immersion in water of a thread or tissue coated with a synthetic resin reduces the adherence of the resin. It has for example been found that when a glass tissue coated with a synthetic resin is folded or twisted the resin tends to break away.

Attempts have already been made to overcome this difficulty by subjecting the fibrous product to treatment by immersion into aqueous solutions of antiswelling agents having hydrophile properties. This treatment, although improving effectively the resistance of the impregnated fibres to water, or reducing the swelling, does not however ensure a true adherence of the coating to its support.

By means of the treatment according to the invention however, it is possible to obtain permanent impregnations resistant to immersion in water as well as to mechanical treatments to which the impregnated glass tissues or fibres may be subject.

According to the invention, the treatment consists in subjecting the thread or tissue to an adhesion-promoting treatment by the aid of a compound of the di-ethylene urea type, vis., a compound having the formula

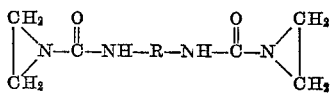

This treatment can be carried out in various ways. According to a first embodiment the adhesion-promoting treatment precedes the impregnation proper. To this effect the support to be treated is introduced into an aqueous solution or dispersion of di-ethylene urea. Subsequently the impregnation with the synthetic resin, for example with a resin of the vinyl type, is effected by the usual processes.

The di-ethylene urea used in this process is obtained by reacting one molecule of an aromatic or aliphatic di-isocyanate, viz., a compound of the formula

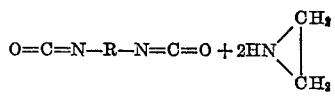

R being the aromatic or aliphatic radical,with two molecules of ethylene imine.

According to a second embodiment the simultaneous application of the adhesion-promoting product and of the resinous impregnation substance is effected. For this purpose, the di-ethylene urea prepared as described herein above is added to the paste of resin used for the impregnation. Subsequently the impregnation is effected with this mixture which in some way is saturated in advance with di-ethylene urea.

It has been ascertained also that in this embodiment adhesion is further improved, and the dispersion of di-ethylene urea is facilitated, if the impregnation mixture in addition to the resin and the di-ethylene urea also contains a given proportion of the organic diisocyanate serving as a base product for the preparation of the di-ethylene urea.

Finally according to a third embodiment which has the advantages of the two preceding ones, the treatments of previous adhesion promoting and the impregnation with a mixture of the resin, the di-ethylene urea and the di-isocyanate are combined with one another.

As a di-isocyanate one may use for example the di-isocyanate of toluene, viz.

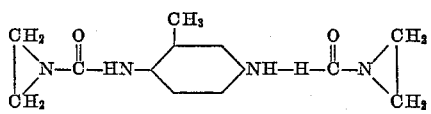

or the di-isocyanate of hexamethylene, viz.,

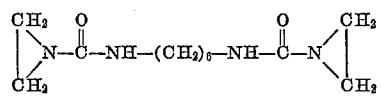

It has been found that under these conditions the adherence of the film of the coating on the textile is from 400 to 500% superior to that of a textile that has not been treated with adhesion promoting substances. This property is permanent and cannot be reduced by immersion in water of the impregnated tissue. These glass tissues, thus treated, do not only retain their mechanical properties but also acquire flexibility and resistance to creasing.

An example of how to carry out the method according to the invention will be given hereinafter.

Example

A glass tissue (oiled or free from oil) is treated at the ambient temperature with an aqueous solution of 2% of toluene di-ethylene urea. This latter compound is prepared in advance by the addition of a solution of 16.8 kilograms of toluene di-isocyanate in 60 litres of acetone to a solution of 8.6 kilograms of di-ethylene amine in 25 litres of acetone. The reaction is carried out at 0° C. By the evaporation of the solvent a reaction product is obtained which is subsequently finely divided. Dispersion of the di-ethylene urea in water is preferred by making the same into a paste in its own weight in alcohol.

After the drying of the glass tissue thus treated at the ambient temperature, the impregnation is effected by the aid of the following mixture:

Vyuilic paste (polyvinyl chloride)__ 44%.
Tri-cresyl phosphate_____ 100 parts, 36%.
Essence of terebenthine_____ 20%.
Toluene di-isocyanate_____ 3 parts.
Toluene di-ethyleneurea (prepared as hereinabove)_____ 2 parts.

Advantageously the dispersion of the paste of di-ethylene urea is facilitated by dissolving the same previously in the di-isocyanate.

After drying the impregnating substance at 150° C. for 15 minutes the impregnated tissue offers the properties set forth hereinabove.

It should be noted that although the invention has been described specially with respect to the coating of glass threads or textiles by means of vinylic resins, the same is not limited to these applications, and the method may be suitable likewise to the improving of the adherence of any other coatings effected by means of natural or synthetic, plastic or resilient materials on textile supports. The above described process, as defined in the appended claims, is illustrated diagrammatically in the accompanying drawing wherein the initial fabric is subjected to treatment with diethylene urea and subsequently to treatment with polyvinylchloride, diethylene urea, and organic di-isocyanate to produce a treated fabric having the advantageous properties referred to above.

We claim:

1. A method of applying coatings of artificial resins to glass threads and fabrics which comprises treating the glass threads and fabrics with a diethyleneurea and then treating the glass threads and fabrics with the artificial resin in admixture with said diethyleneurea and with an organic diisocyanate.

2. A method of applying coatings of artificial resins to glass threads and fabrics which comprises treating the glass threads and fabrics with a diethyleneurea and then treating the glass threads and fabrics with the artificial resin in admixture with said diethyleneurea and with an organic diisocyanate, said organic diisocyanate being selected from the group consisting of toluene diisocyanate and hexamethylene diisocyanate.

3. A method of applying coatings of polyvinylchloride to glass threads and fabrics which comprises the steps of treating the threads and fabrics with a diethyleneurea contained in a liquid medium, drying the treated material, and then treating the material with the polyvinylchloride in admixture with said diethyleneurea and with an organic diisocyanate selected from the group consisting of toluene diisocyanate and hexamethyldiisocyanate.

References Cited in the file of this patent

UNITED STATES PATENTS

| | | |
|---|---|---|
| 2,317,965 | Bestian et al. | Apr. 27, 1943 |
| 2,327,760 | Bestian et al. | Aug. 24, 1943 |
| 2,341,413 | Pense et al. | Feb. 8, 1944 |
| 2,763,573 | Biefeld | Sept. 18, 1956 |